US010308094B2

(12) United States Patent
Capellmann et al.

(10) Patent No.: US 10,308,094 B2
(45) Date of Patent: Jun. 4, 2019

(54) WARM OR COLD AIR CHANNEL WITH SLOTS TO OPTIMIZE CONTROL CURVES

(71) Applicant: Halla Visteon Climate Control Corp., Daejeon (KR)

(72) Inventors: Christoph Capellmann, Würselen (DE); Torsten Klein, Troisdorf (DE); Detlef Handwerk, Köln (DE); Evzi Duka, Köln (DE); Raymond Ambs, Wegberg (DE); Johannes Stausberg, Köln (DE)

(73) Assignee: HANON SYSTEMS, Daejeon-si (KR)

( * ) Notice: Subject to any disclaimer, the term of this patent is extended or adjusted under 35 U.S.C. 154(b) by 207 days.

(21) Appl. No.: 14/722,228

(22) Filed: May 27, 2015

(65) Prior Publication Data

US 2015/0343877 A1  Dec. 3, 2015

(30) Foreign Application Priority Data

May 30, 2014  (DE) .................. 10 2014 107 664

(51) Int. Cl.
*B60H 1/00* (2006.01)

(52) U.S. Cl.
CPC ..... *B60H 1/00028* (2013.01); *B60H 1/00057* (2013.01); *B60H 1/00035* (2013.01); *B60H 2001/00092* (2013.01)

(58) Field of Classification Search
CPC ............ B60H 1/00028; B60H 1/00057; B60H 1/00035; B60H 2001/00092
USPC ................................................. 454/160, 161
See application file for complete search history.

(56) References Cited

U.S. PATENT DOCUMENTS

| 6,106,386 A * | 8/2000 | Schwarz | B60H 1/0005 454/143 |
| 6,668,909 B2 * | 12/2003 | Vincent | B60H 1/0005 165/203 |
| 6,758,742 B2 * | 7/2004 | Farag | B60H 1/00835 165/42 |
| 7,475,720 B2 * | 1/2009 | Kusaka | B60H 1/00064 165/202 |

(Continued)

FOREIGN PATENT DOCUMENTS

| DE | 102007048331 A1 | 4/2008 |
| JP | S57202315 U | 12/1982 |
| JP | H1148747 A | 2/1999 |

(Continued)

*Primary Examiner* — Gregory L Huson
*Assistant Examiner* — Dana K Tighe
(74) *Attorney, Agent, or Firm* — Shumaker, Loop & Kendrick, LLP; James D. Miller

(57) ABSTRACT

A heating and air conditioning device includes a warm air path that leads through a heat exchanger to a mixing chamber and to outlets of the heating and air conditioning device, and a cold air path that leads from the evaporator to the mixing chamber and the outlets of the heating and air conditioning device. A warm air duct is located at an end of the warm air path and an entrance to the mixing chamber. A cold air duct is located at the end of the cold air path and the entrance to the mixing chamber. One or more openings are formed on one of a side wall of the warm air duct and a side wall of the cold air duct so that air can flow from the cold air path into the warm air duct and from the warm air path into the cold air duct.

15 Claims, 4 Drawing Sheets

(56) References Cited

U.S. PATENT DOCUMENTS

| | | | | |
|---|---|---|---|---|
| 2008/0200110 A1* | 8/2008 | Ghosh | ............... | B60H 1/00671 454/160 |
| 2014/0087646 A1* | 3/2014 | Kitamura | ........... | B60H 1/00064 454/126 |

FOREIGN PATENT DOCUMENTS

| | | | |
|---|---|---|---|
| JP | 2004237940 | A | 8/2004 |
| JP | 2005138735 | A | 6/2005 |
| JP | 2007125955 | A | 5/2007 |
| JP | 2009143330 | A | 7/2009 |
| JP | 2009227026 | A | 10/2009 |
| JP | 4971963 | B2 | 7/2012 |
| KR | 1020130100692 | A | 9/2013 |

\* cited by examiner

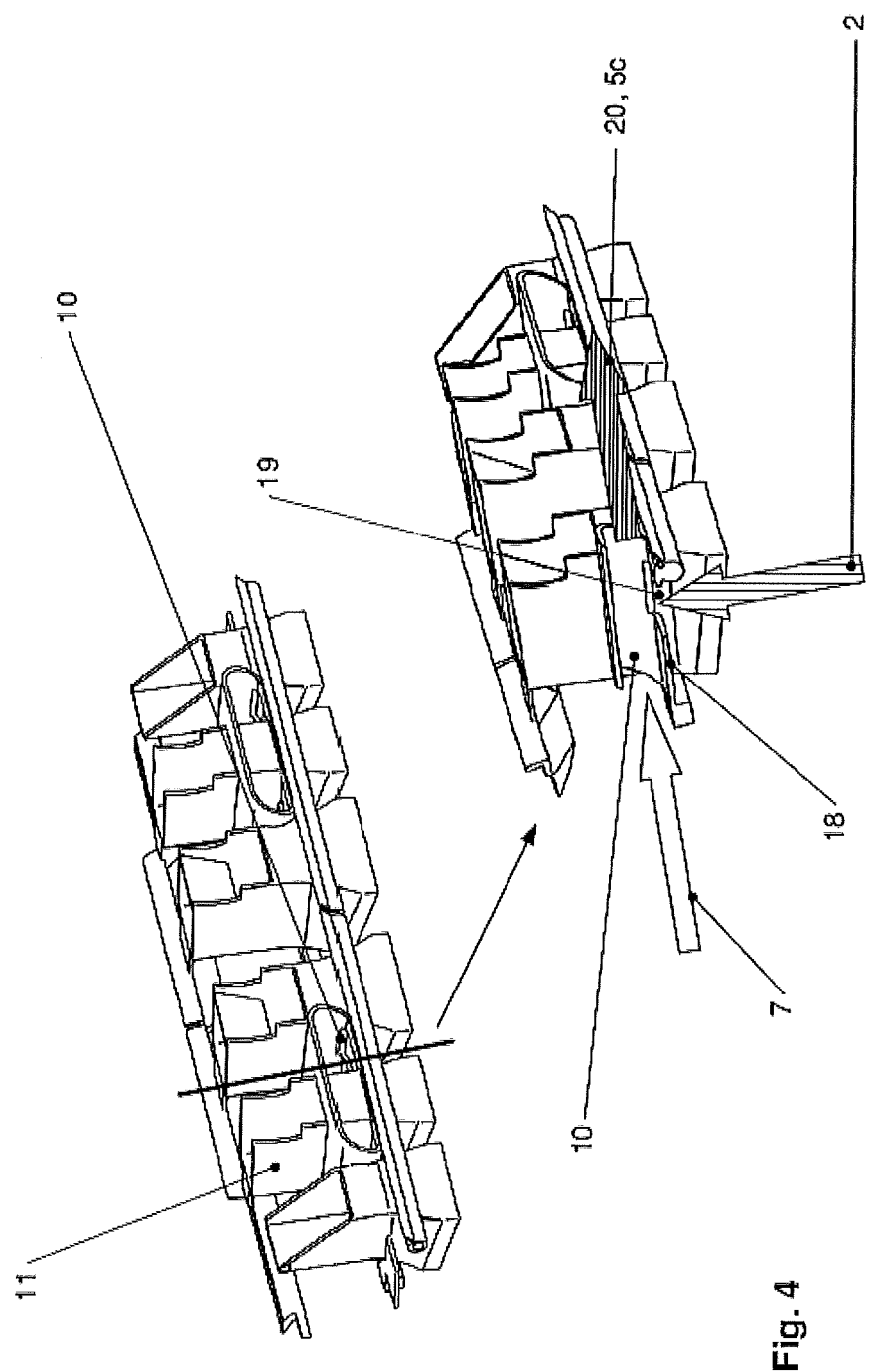

WARM OR COLD AIR CHANNEL WITH SLOTS TO OPTIMIZE CONTROL CURVES

CROSS-REFERENCE TO RELATED APPLICATION

This application claims priority to German Patent Application Serial No. DE 10 2014 107 664.8 filed on May 30, 2014, hereby incorporated herein by reference in its entirety.

FIELD OF THE INVENTION

The invention concerns a heating and air conditioning device for a motor vehicle. It comprises a warm air and a cold air duct, preferably in an assembled condition or in a combined structural part. To optimize the temperature control curves, the warm air duct and/or the cold air duct has additional openings.

BACKGROUND OF THE INVENTION

In a heating and air conditioning device of an automobile there are two air flow pathways. After the evaporator, air cooled by the evaporator can either flow via a cold air path directly to a mixing chamber or to outlets of the air conditioning device and thus past a heat exchanger, or flow via a warm air pathway first through the heat exchanger and then into the mixing chamber or to the outlets of the air conditioning device. In normal or comfort mode, air flow after the evaporator is divided between the cold air pathway on the one hand and the warm air pathway on the other hand, so that a mixed temperature is produced in the mixing chamber underneath the outlets of the heating and air conditioning device.

Mixing chambers are very small, owing to design space. An adequate mixing of cold and warm air will not occur in the mixing chambers, or will be insufficient, without supporting measures or installed parts such as ducts or air baffles, so that there may be excessively large temperature differences at individual outlets of the heating and air conditioning device. Maximum permissible temperature differences at individual outlets are specified by the car makers.

In order to control a temperature in the mixing chamber, a ratio of air quantities along the cold air pathway and the warm air pathway must be regulated. This is done with the aid of a temperature gate, which optionally blocks entirely one of the two pathways or block portions of a particular path by adjusting the gate position between end positions of the temperature gate. However, it may be necessary, due to limited design space, for the warm air path and the cold air path to be opened or closed by a separate gate. Yet the approach with two gates has the drawback that a quantity of warm air that flows into a warm air duct which is positioned at the end of the warm air path, at the entrance to the mixing chamber, or a quantity of cold air that flows into a cold air duct which is positioned at the end of the cold air path at the entrance to the mixing chamber, cannot be so well controlled as when only one temperature gate is installed, which opens up the entry cross section of a warm air duct, for example, in proportion to the gate travel.

In presently known devices, the use of two gates means that a temperature in a defrost outlet, for example, increases too fast at temperature gate positions "full cold" to "roughly 30/40% warm" and then hardly changes at all in temperature gate positions greater than 50%. Furthermore, a temperature in a ventilation outlet behaves opposite to that in the defrost outlet.

When cold air ducts are installed that are supposed to take cold air to outlets in a foot region, air quantity also cannot be controlled via the travel of the temperature gate. In the beginning, a temperature in the outlets of the foot region is reduced as desired, but for temperature gate positions greater than 50% this effect is no longer desirable. In this case as well, a control mechanism is lacking.

When conventional warm and cold air ducts are used, that is, ducts with inlet and outlet openings of any desired cross section and duct walls closed at the side, there are no control mechanisms for steering the air flow and thus, there are no mechanisms for controlling the function of the ducts as a function of the temperature gate position.

The problem which the invention proposes to solve consists in a control mechanism which enables better controlling of the function of warm and/or cold air ducts in a heating and air conditioning device.

SUMMARY OF THE INVENTION

The problem is solved by a heating and air conditioning device for motor vehicles. The heating and air conditioning device includes a warm air path, which leads via at least one heat exchanger to a mixing chamber and to outlets of the heating and air conditioning device positioned downstream from the mixing chamber to an interior of a passenger space, so that air cooled by an evaporator can flow, passing through the heat exchanger, to the mixing chamber and to the outlets through the warm air path. The heating and air conditioning device further includes a cold air path, which leads directly, that is, not via the at least one heat exchanger, but bypassing it, from the evaporator to the mixing chamber and to the outlets of the heating and air conditioning device, so that air cooled by the evaporator can get directly to the mixing chamber and to the outlets of the heating and air conditioning device. Additionally, the heating and air conditioning device includes a warm air duct at the end of the warm air path, at the entrance to the mixing chamber, wherein one side wall of the warm air duct is turned toward the cold air path, and a cold air duct at the end of the cold air path and at the entrance to the mixing chamber, wherein one side wall of the cold air duct is turned toward the warm air path. According to the invention, one or more openings are formed on the side wall of the warm air duct which is turned toward the cold air path and/or on the side wall of the cold air duct which is turned toward the warm air path, so that cold air can flow from the cold air path into the warm air duct and/or warm air from the warm air path into the cold air duct.

The solution according to the invention is especially advantageous for the design of a heating and air conditioning device in which separate temperature gates are provided for the warm air path on the one hand and for the cold air path on the other hand for partial or total opening and closing of the warm air path or the cold air path, in order to control a quantity of air flowing via the different paths to the mixing chamber and to the outlets.

With openings in the warm air duct through which cold air can flow into the warm air duct, at temperature gate positions from "full cold" to "roughly 30/40% warm", a quantity of warm air flowing through the warm air duct is prevented from becoming too large, and a defrost temperature is prevented from rising too fast and too much, for example. At low temperature gate settings, a quantity of cold air is predominant in the system. Thus, cold air that flows into the warm air duct through an opening, such as a slit, can partly block the warm air entering the warm air duct from below.

The further the temperature gate is moved in the direction "full warm", the more warm air is provided in the warm air path and the less cold air is provided in the cold air path. Thus, the force of the cold air also becomes increasingly smaller and the cold air can block increasingly less warm air in the warm air duct. At a certain temperature gate setting, a ratio of the air flows in the cold and warm air path is changed so that the warm air in the warm air duct then has so large a force that the cold air can hardly flow across the opening, such as the slit, into the warm air duct. The warm air duct then achieves its full effect. By means of the number, size, shape and position of the openings in the side wall of the warm air duct, the functionality of the warm air duct can be controlled. The openings can be horizontal, rectangular slits and/or vertical slits and/or slits in triangular form and/or trapezoidal form and/or round openings and/or perforation patterns.

Similar structure is applied to the cold air duct. The cold air duct has, preferably in its side wall directed toward the floor, one or more openings, through which warm air can enter from the warm air path. At temperature gate settings from "full cold" to "roughly 30/40% cold", a quantity of cold air in the system prevails, so that the cold air can flow almost unhindered through the cold air duct, since it blocks the way for the warm air which might flow in from the warm air path. Thus, the cold air duct achieves its full effect. However, as the temperature gate is moved in the direction toward "full warm", more warm air flows through the one or more openings from the warm air path to the cold air path, so that the quantity of cold air in the cold air path decreases accordingly. In this way, the force of the cold air also becomes increasingly smaller while the force of the warm air increases. Thus, more and more warm air can flow into the cold air duct and the effect of the cold air duct is increasingly reduced, as desired.

According to one embodiment of the invention, the warm air duct and the cold air duct are configured as an assembly or as a combined structural part, hereinafter called a warm/cold air duct. The warm air duct and the cold air duct are oriented differently in it, so that they cross each other, while the cold air duct runs along an outer wall of the warm air duct. The cold air duct encloses a portion of the warm air duct on its circumference. In other words: the cold air duct encloses the warm air duct or the warm air duct penetrates the cold air duct such that the penetration divides the cold air duct into two ducts, which come together once more downstream from the warm air duct. Alternatively, the warm/cold air duct in which the warm air duct and the cold air duct are oriented differently so that they cross each other can also be configured in the form so that the cold air duct penetrates the warm air duct, such that the cold air duct divides the warm air duct into two ducts. It is understood that the warm air duct and the cold air duct may share one or more side walls. It is further understood that one or more openings may be formed in the one or more shared side walls.

Besides a warm air duct and/or a cold air duct with openings, additional warm air ducts can also be provided with or without openings at the entrance to the mixing chamber.

According to one advantageous embodiment of the invention, one or more openings of the cold air duct are configured in the side wall directed toward the floor, so that warm air flowing from the warm air path can enter from below.

BRIEF DESCRIPTION OF THE DRAWINGS

Further details, features and benefits of embodiments of the invention will emerge from the following description of sample embodiments with reference to the corresponding drawings. There are shown.

DETAILED DESCRIPTION OF EXEMPLARY

Embodiments of the Invention

Figure 1:
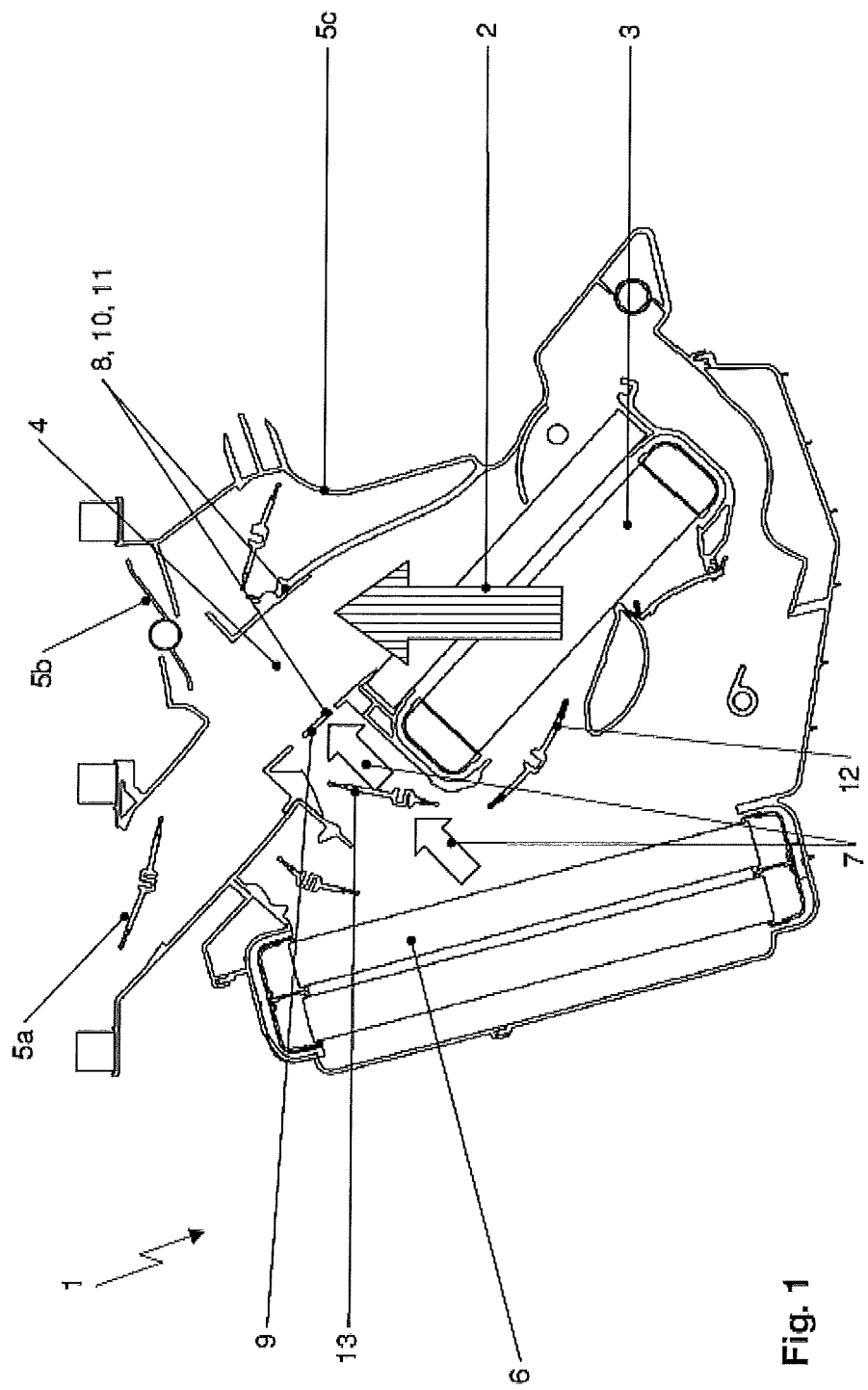
FIG. 1, a schematic sectional representation of a heating and air conditioning device with a combined warm/cold air duct, FIG. 2, a more detailed perspective representation of a cutout of the combined warm/cold air duct, FIG. 3, a perspective representation of the cutout of the combined warm/cold air duct with a section through the warm air duct, and FIG. 4, a perspective representation of the cutout of the combined warm/cold air duct with a section through the cold air duct.

FIG. 1 shows a schematic sectional representation of a heating and air conditioning device 1 for motor vehicles. The heating and air conditioning device 1 comprises a warm air path 2, which leads via a heat exchanger 3 to a mixing chamber 4 and to outlets 5a, 5b, 5c of the heating and air conditioning device 1 to an interior space of the vehicle, positioned downstream from the mixing chamber 4. In this way, air cooled by an evaporator 6 can flow, passing through the heat exchanger 3, to the mixing chamber 4 and to the outlets 5a, 5b, 5c through the warm air path 2. The heating and air conditioning device 1 further comprises a cold air path 7, which leads directly, that is, not via the heat exchanger 3, but bypassing it, from the evaporator 6 to the mixing chamber 4 and to the outlets 5a, 5b, 5c of the heating and air conditioning device 1, so that air cooled by the evaporator 6 can get directly to the mixing chamber 4 and to the outlets 5a, 5b, 5c of the heating and air conditioning device 1. There is a warm air duct 8 at the end of the warm air path 2, at the entrance to the mixing chamber 4. One side wall 9 of the warm air duct 8 is turned toward the cold air path 7. There is a cold air duct 10 at the end of the cold air path 7, at the entrance to the mixing chamber 4, this not being shown in detail in FIG. 1. One side wall of the cold air duct 10, also not shown, is turned toward the warm air path 2. The warm air duct 8 and the cold air duct 10 in the embodiment depicted are configured together inside a combined structural part, hereinafter called the warm/cold air duct 11. FIG. 1 shows the heating and air conditioning device 1 in which separate gates 12, 13 are respectively provided for the warm air path on the one hand and for the cold air path on the other hand for the partial or complete opening and closing of the warm air path, namely, the warm air gate 12, and the cold air path, namely, the cold air gate 13, in order to control the amount of air flowing by the different paths 2, 7 to the mixing chamber 4 and the outlets 5a, 5b, 5c.

Figure 2:
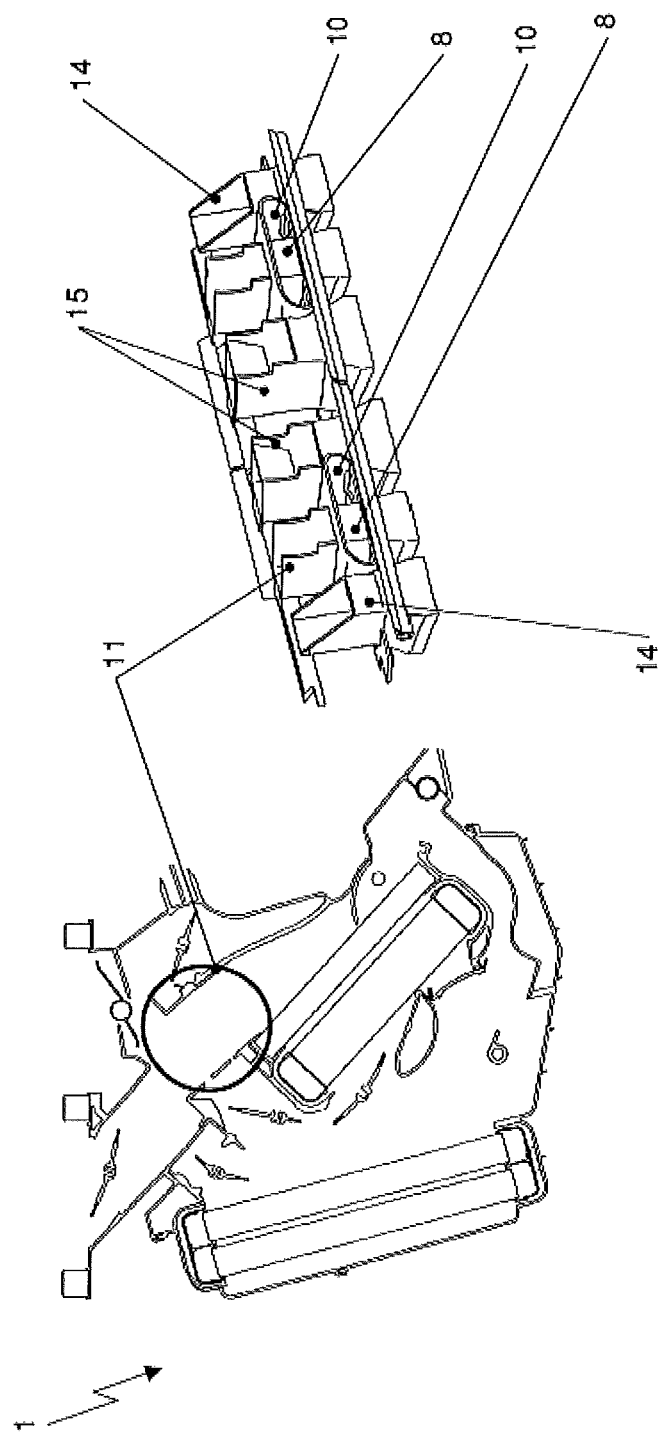

FIG. 2 shows a more detailed perspective representation of a cutout of the heating and air conditioning device 1 with two combined warm/cold air ducts 11 for the left and the right side of the motor vehicle. A combined structural part 11 comprises both a horizontally oriented cold air duct 10 and a vertically oriented warm air duct 8. Besides the combined warm/cold air ducts 11, additional warm air ducts 14, 15 are provided.

Figure 3:
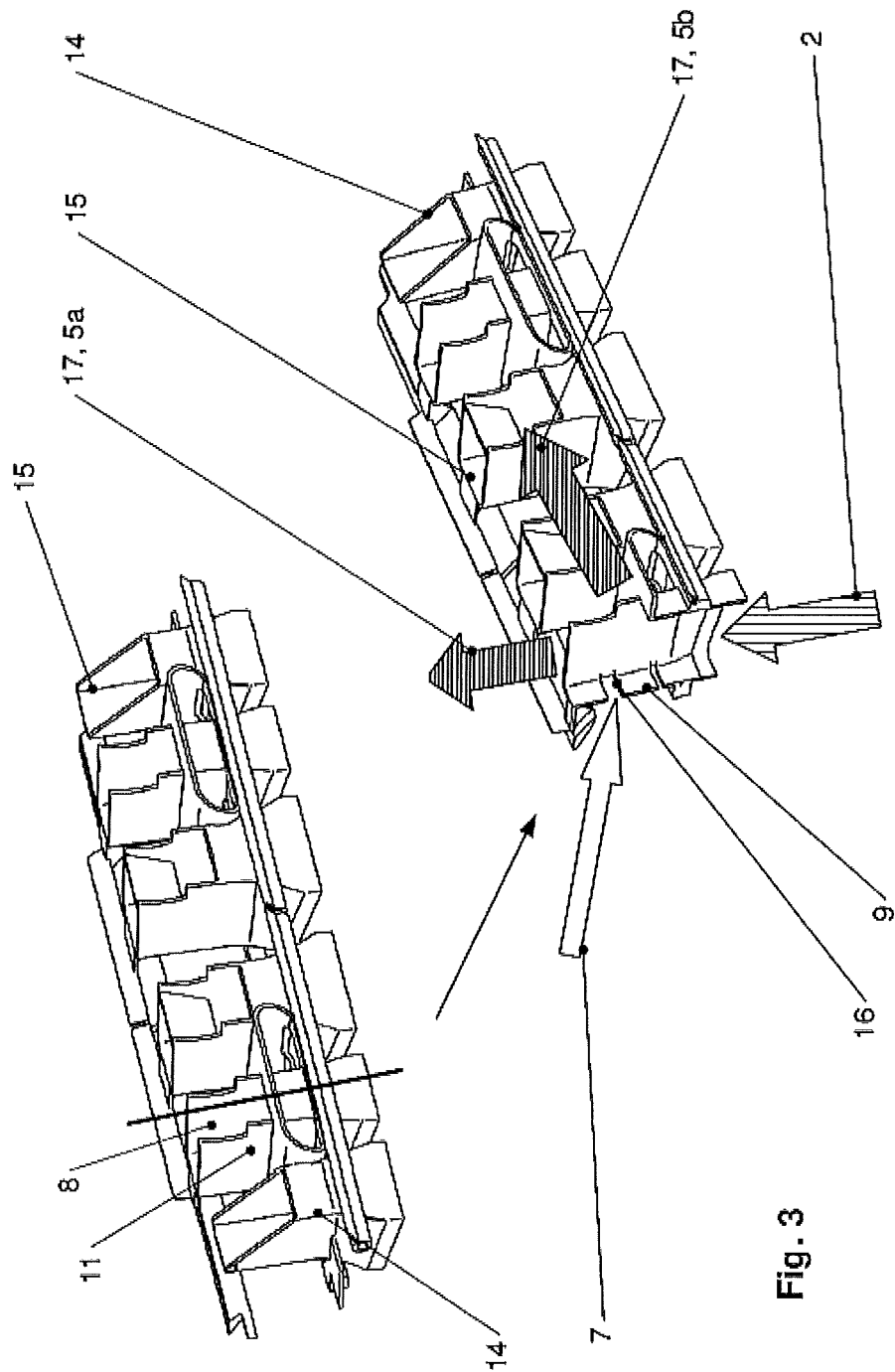

FIG. 3 shows a perspective representation of the cutout of the combined warm/cold air duct 11 with a section through the part of the warm air duct 8. On the side wall 9 of the warm air duct 8, facing the cold air path 7, openings 16 are made in the form of horizontal, rectangular slits 16, so that cold air from the cold air path 7 can get into the warm air duct 8. The additional warm air ducts 14, 15 are configured either as conventional warm air ducts 14 with closed side walls or as pure warm air ducts 15 with openings directed toward the cold air path 7 (not shown in FIG. 3). The warm air 17 emerging from the warm/cold air duct 11 finally gets to the defrost outlet 5a and to the ventilation outlet 5b.

The slits 16 through which cold air can flow into the warm air duct 8 prevent an amount of warm air flowing through the warm air duct 8 from becoming too large at temperature gate settings from "full cold" to "around 30/40%", so that for example the defrost temperature does not rise too fast and too much. At low temperature gate settings, a quantity of cold air is predominant in the system and thus an amount of cold air flowing through a slit 16 into the warm air duct 8 can partly block the warm air entering the warm air duct 8 from below. As the temperature gate is moved in the direction toward "full warm", an amount of air in the warm air path 2 increases and an amount of air in the cold air path 7 decreases accordingly. Thus, the force of the amount of cold air also becomes increasingly less and the amount of cold air can block increasingly less warm air in the warm air duct 8. At a certain temperature gate setting, a ratio of air flow in the cold air path 7 to the air flow in the warm air path 2 changes such that the warm air in the warm air duct 8 has so much force that the cold air can hardly flow into the warm air duct 8 through the slit 16. The warm air duct 8 then achieves its full effect. The functionality of the warm air duct 8 can be steered by the number, size, shape and position of the slits 16 in the side wall 9 of the warm air duct 8.

FIG. 4 shows a perspective representation of the cutout of the combined warm/cold air duct 11 with a section through the cold air duct 10. At a side wall 18 of the cold air duct 10, facing the warm air path 2, that is, at the bottom 18 of this, there is made an opening 19 so that warm air can flow from the warm air path 2 into the cold air duct 10.

At temperature gate settings from "full cold" to "around 30/40%", a quantity of cold air in the system prevails and thus cold air can flow almost unhindered through the cold air duct 10 and emerge as an air flow 20 from the cold air duct 10 toward the foot region outlet 5c, since the cold air in the cold air duct 10 blocks the warm air which could have flowed from below through the opening 19 of the warm air path 2. The cold air duct 10 achieves its full effect. As the temperature gate is moved in the direction toward "full warm", a quantity of air in the warm air path 2 increases and the quantity of air in the cold air path 7 decreases accordingly. Thus, the force of the quantity of cold air also becomes increasingly less and the force of the quantity of warm air increases. Thus, more and more warm air can flow from the warm air path 2 into the cold air duct 10 and the effect of the cold air duct 10 is increasingly reduced, as desired.

From the foregoing description, one ordinarily skilled in the art can easily ascertain the essential characteristics of this invention and, without departing from the spirit and scope thereof, can make various changes and modifications to the invention to adapt it to various usages and conditions.

LIST OF REFERENCE SYMBOLS 1 heating and air conditioning device
2 warm air path, path
3 heating heat exchanger
4 mixing chamber
5a outlet, defrost outlet
5b outlet, ventilation outlet
5c outlet, foot region outlet
6 evaporator
7 cold air path, path
8 warm air duct
9 side wall of the warm air duct 8 (turned toward the cold air path 7)
10 cold air duct
11 combined structural part, warm/cold air duct
12 separate gate, warm air gate
13 separate gate, cold air gate
14 warm air duct
15 warm air duct
16 openings, slits
17 emerging warm air
18 side wall of the cold air duct 10, floor
19 opening (in the side wall 18 of the cold air duct 10)
20 air flow emerging from the cold air duct 10

What is claimed is:

1. A heating and air conditioning device for a motor vehicle, comprising:
a warm air path including a first warm air duct, the warm air path fluidly interconnecting an evaporator and at least one heat exchanger to a mixing chamber; and
a cold air path including a cold air duct, the cold air path fluidly interconnecting the evaporator and the mixing chamber, wherein a side wall of the first warm air duct faces toward the cold air path and a side wall of the cold air duct faces toward the warm air path, wherein the side wall of the first warm air duct is oriented along a plane perpendicular to a direction of cold air flowing through the cold air path and the side wall of the cold air duct is oriented along a plane perpendicular to a direction of warm air flowing through the warm air path, wherein the first warm air duct and the cold air duct are configured as an assembly including the first warm air duct penetrating the cold air duct to divide the cold air duct into a first partial cold air duct to a first side of the first warm air duct and a second partial cold air duct to a second side of the first warm air duct arranged opposite the first side of the first warm air duct, and wherein an opening is formed in at least one of the side wall of the first warm air duct to allow a quantity of the cold air to flow from the cold air path into the first warm air duct or the side wall of the cold air duct to allow a quantity of the warm air to flow from the warm air path into the cold air duct, wherein the cold air duct and the first warm air duct are defined by a structural part, and wherein the cold air duct is horizontally oriented with respect to the structural part and the first warm air duct is vertically oriented with respect to the structural part.

2. The heating and air conditioning device according to claim 1, wherein the opening is one of a horizontal rectangular slit, a vertical slit, a slit in triangular form, a slit in trapezoidal form, a round opening, and a perforation pattern.

3. The heating and air conditioning device according to claim 2, wherein the cold air duct extends along an outer wall of the first warm air duct.

4. The heating and air conditioning device according to claim 1, wherein the cold air duct extends along an outer wall of the first warm air duct.

5. The heating and air conditioning device according to claim 1, wherein a second warm air duct fluidly interconnects the at least one heat exchanger and the mixing chamber.

6. The heating and air conditioning device of claim 5, wherein the second warm air duct includes an opening formed in a side wall thereof facing toward the cold air path.

7. The heating and air conditioning device according to claim 1, wherein the opening formed in the side wall of the first warm air duct or the side wall of the cold air duct is configured downwardly to allow air flowing through the opening to enter from below.

8. The heating and air conditioning device according to claim 1, wherein the warm air flowing from the warm air path is not directly introduced to the structural part through the cold air duct.

9. A heating and air conditioning device for a motor vehicle, comprising:
a warm air path including a first warm air duct, the warm air path fluidly interconnecting an evaporator and at least one heat exchanger to a mixing chamber, the first warm air duct positioned at a first entrance to the mixing chamber; and
a cold air path including a cold air duct, the cold air path fluidly interconnecting the evaporator and the mixing chamber, the cold air duct positioned at a second entrance to the mixing chamber, the first warm air duct and the cold air duct configured as an assembly including the first warm air duct penetrating the cold air duct to divide the cold air duct into a first partial cold air duct to a first side of the first warm air duct and a second partial cold air duct to a second side of the first warm air duct arranged opposite the first side of the first warm air duct, wherein a side wall of the first warm air duct faces toward the cold air path and a side wall of the cold air duct faces toward the warm air path, wherein the side wall of the first warm air duct is oriented along a plane perpendicular to a direction of cold air flowing through the cold air path and the side wall of the cold air duct is oriented along a plane perpendicular to a direction of warm air flowing through the warm air path, wherein an opening is formed in the side wall of the first warm air duct to allow a quantity of the cold air to flow from the cold air path into the first warm air duct and an opening is formed in the side wall of the cold air duct to allow a quantity of the warm air to flow from the warm air path into the cold air duct, the openings formed as one of horizontal rectangular slits, vertical slits, slits in triangular form, slits in trapezoidal form, round openings, and perforation patterns, wherein the cold air duct and the first warm air duct are defined by a structural part, and wherein the cold air duct is horizontally oriented with respect to the structural part and the first warm air duct is vertically oriented with respect to the structural part.

10. The heating and air conditioning device according to claim 9, wherein a second warm air duct is provided at the first entrance to the mixing chamber.

11. The heating and air conditioning device of claim 10, wherein the second warm air duct includes one or more openings formed in a side wall thereof facing the cold air path.

12. The heating and air conditioning device according to claim 9, wherein the openings formed in the side wall of the warm air duct and the side wall of the cold air duct are configured downwardly to allow air flowing through the openings to enter from below.

13. A heating and air conditioning device for a motor vehicle, comprising:
a warm air path including a first warm air duct, the warm air path fluidly interconnecting an evaporator and at least one heat exchanger to a mixing chamber, the first warm air duct positioned at a first entrance to the mixing chamber; and
a cold air path including a cold air duct, the cold air path fluidly interconnecting the evaporator and the mixing chamber, the cold air duct positioned at a second entrance to the mixing chamber, the first warm air duct and the cold air duct configured as an assembly and including the first warm air duct penetrating the cold air duct to divide the cold air duct into a first partial cold air duct to a first side of the first warm air duct and a second partial cold air duct to a second side of the first warm air duct arranged opposite the first side of the first warm air duct, wherein a side wall of the first warm air duct is oriented along a plane perpendicular to a direction of cold air flowing through the cold air path and a side wall of the cold air duct is oriented along a plane perpendicular to a direction of warm air flowing through the warm air path, wherein one or more openings are formed in at least one of the sidewall of the first warm air duct to allow a quantity of the cold air to flow from the cold air path into the first warm air duct or the sidewall of the cold air duct to allow a quantity of the warm air to flow from the warm air path into the cold air duct, the one or more openings formed as at least one of horizontal rectangular slits, vertical slits, slits in triangular form, slits in trapezoidal form, round openings, and perforation patterns, wherein the cold air duct and the first warm air duct are defined by a structural part, and wherein the cold air duct is horizontally oriented with respect to the structural part and the first warm air duct is vertically oriented with respect to the structural part.

14. The heating and air conditioning device according to claim 13, wherein a second warm air duct is provided at the entrance to the mixing chamber, and wherein the second warm air duct includes one or more openings formed in a side wall of the second warm air duct facing toward the cold air path.

15. The heating and air conditioning device according to claim 13, wherein the one or more openings are configured to allow vertical flow of air through the one or more openings.

* * * * *